(12) United States Patent
Korangy et al.

(10) Patent No.: US 9,083,725 B2
(45) Date of Patent: Jul. 14, 2015

(54) SYSTEM AND METHOD PROVIDING HIERARCHICAL CACHE FOR BIG DATA APPLICATIONS

(71) Applicants: Fred Korangy, Annapolis, MD (US);
Hamed Ghasemzadeh, Tehran (IR);
Mohsen Arjmandi, tehran (IR); Reza Azmi, Tehran (IR)

(72) Inventors: Fred Korangy, Annapolis, MD (US);
Hamed Ghasemzadeh, Tehran (IR);
Mohsen Arjmandi, tehran (IR); Reza Azmi, Tehran (IR)

( * ) Notice: Subject to any disclaimer, the term of this patent is extended or adjusted under 35 U.S.C. 154(b) by 0 days.

(21) Appl. No.: 14/531,171

(22) Filed: Nov. 3, 2014

(65) Prior Publication Data

US 2015/0058438 A1    Feb. 26, 2015

(51) Int. Cl.
*G06F 15/16* (2006.01)
*H04L 29/08* (2006.01)
*G06F 7/527* (2006.01)
*G06F 7/78* (2006.01)

(52) U.S. Cl.
CPC .......... *H04L 67/1097* (2013.01); *G06F 7/5272* (2013.01); *G06F 7/785* (2013.01)

(58) Field of Classification Search
CPC .............................. G06F 7/5272; G06F 7/785
USPC .......................... 709/203, 220; 711/109, 119
See application file for complete search history.

(56) References Cited

U.S. PATENT DOCUMENTS

| 5,530,890 A * | 6/1996 | Moore et al. ..................... 712/32 |
| 5,604,915 A * | 2/1997 | Moore et al. ..................... 710/60 |
| 5,659,703 A * | 8/1997 | Moore et al. ................. 711/109 |
| 2008/0154860 A1 * | 6/2008 | Chen et al. ......................... 707/3 |

* cited by examiner

*Primary Examiner* — Khanh Dinh
(74) *Attorney, Agent, or Firm* — Berry Choobin; Patent 360

(57) ABSTRACT

The embodiments herein develop a system for providing hierarchical cache for big data processing. The system comprises a caching layer, a plurality of actors in communication with the caching layer, a machine hosting the plurality of actors, a plurality of replication channels in communication with the plurality of actors, a predefined ring structure. The caching layer is a chain of memory and storage capacity elements, configured to store a data from the input stream. The plurality of actors is configured to replicate the input data stream and forward the replicated data to the caching layer. The replication channels are configured to forward the replicated data from a particular actor to another actor. The predefined ring structure maps the input data to the replica actors.

9 Claims, 4 Drawing Sheets

SYSTEM AND METHOD PROVIDING HIERARCHICAL CACHE FOR BIG DATA APPLICATIONS

CROSS-REFERENCE TO RELATED APPLICATION

The present application claims the priority of the U.S. Non Provisional Patent Application with Ser. No. 14/457,145 filed on Aug. 12, 2014 with the title "SYSTEM AND METHOD PROVIDING HIERARCHICAL CACHE FOR BIG DATA APPLICATIONS", which claims priority of the U.S. Provisional patent application with Ser. No. 61/864,684 filed on Aug. 12, 2013, and the contents of which are incorporated by reference herein.

BACKGROUND

1. Technical Field

The embodiments herein are generally related to field of cloud computing. The embodiments herein are particularly related to a system providing memory based storage solution for big data applications. The embodiments herein more particularly relates to a system and method for providing hierarchical cache for big data in a cloud infrastructure.

2. Description of the Related Art

Distributed systems are those having more than one CPU on at least two computing board or machines. Such systems are commonly used to meet the workload requirements in-order to scale a storage capacity of a cluster computing system. These systems comprise different independent parts that are connected to each other with the network links. The large scale storage systems are capable of consolidating more than one hard disk and may store on more than one thousand disks that are managed by a distributed storage system in some cases. When a failure occurs on a hard disk, the storage software manages data replicas in more than one disk to increase a reliability of data and to ensure a recoverability of the system. The Distributed Storage Systems (DDS) are storage specific and operate independently based on the medium of storage used for storing a data. The DDS independently sends the data through network links for replication purposes to increase to reliability of the stored data in case of failures.

The amount of data generated by the sensors, machines, and individuals increases exponentially. The Intelligence, Surveillance and Reconnaissance (ISR) platforms have been moved towards higher resolution sensors and persistence surveillance. This has lead to the collection of enormous volume of data. Similarly, enterprises collect the large amounts of operational data from Information Technology (IT) systems with the goal of improving operations and cyber security. Finally, the data generated by people, especially in the context of social media explodes heavily. This flow of multi-source data leads to an opportunity to extract real time information that is immediately relevant to users. Big data includes information garnered from social media, data from internet-enabled devices (including smart phones and tablets), machine data, video and voice recordings, and the continued preservation and logging of structured and unstructured data. Big data refers to the dynamic, large and disparate volumes of data created by people, tools and machines which are distributed over a set of storages. The data gathered may be stored beforehand or may be a continuous stream to be accessed, stored and analyzed with distributed algorithms and frameworks. Big Data analytics inherently requires a set of distributed computing, networking and storage resources that may be available locally or to be rented from a cloud infrastructure. The system occasionally need memory based storage solutions for Big Data processing applications. On the other hand, data volatility characteristic of RAM modules may challenge DDS for data reliability that lead to availability of data, especially when RAM based DDS are used as a caching mechanism for Disk based DDS. The independent nature of such systems causes unnecessary duplications in data transfers through networks links The aforementioned drawbacks are responsible for creating need for a better system with more efficient methods to eliminate the redundancies for better combination of DDS over different storage mediums. Further, there is a need for a system with different types of memories combined in regard to improve the efficiency of the connectivity in replication process.

The above mentioned shortcomings, disadvantages and problems are addressed herein and which will be understood by reading and studying the following specification.

OBJECTS OF THE EMBODIMENTS HEREIN

The primary object of the embodiments herein is to provide a system and method for providing a hierarchical cache for big data processing.

Another object of the embodiments herein is to provide an actor system which facilitates asynchronous messaging and event driven middleware for development of the big data processing system.

Yet another object of the embodiments herein is to provide an automated system to create loosely available memory in a distributed memory architecture or system.

Yet another object of the embodiments herein is to provide a distributed system to duplicate the received stream chunks using asynchronous actor messaging.

Yet another object of the embodiments herein is to provide a replication mechanism which is synchronized across the data persistence and caching stack to eliminate duplications for a given stream chuck efficiently.

Yet another embodiment herein is to track and monitor the data generated by the distributed system.

Yet another embodiment herein is to provide a real time analytics on the information generated from widely distributed systems.

These and other objects and advantages of the embodiments herein will become readily apparent from the following detailed description taken in conjunction with the accompanying drawings.

SUMMARY

The various embodiments herein provide a system for providing hierarchical cache for big data processing. The system comprises a caching layer, a plurality of actors in communication with the caching layer, a machine hosting the plurality of actors, a plurality of replication channels in communication with the said plurality of actors, and a predefined ring structure. The caching layer is a chain of memory and storage capacity elements or systems, configured to store a data from an input stream. The plurality of actors is configured to replicate the input data stream and forward the replicated data to the caching layer. The replication channels are configured to forward the replicated data from a particular actor to another actor. The predefined ring structure maps the input data to the replica actors According to an embodiment herein, the plurality of actors comprises a source actor which is configured to receive the input data and produce a first replica of the input data, a destination actor and a plurality of replication actors.

According to an embodiment herein, the caching layer comprises a stack, a top element of the stack and an adapter operating on a top element of stack. The stack further comprises a plurality of storage elements, and wherein each storage element is configured to store an input stream chunk. The storage elements of the stack are hierarchically sorted according to an access performance of main memory operations and cost priorities. The top element of the stack is a performable memory which is available to the actor. The adapter is configured to push a received data onto the top of element.

According to an embodiment herein, the caching layer gradually pushes the received input stream chunk into a pre-allocated free space in each storage element of the sorted stack, According to an embodiment herein, the caching layer fetches the stored stream chunks in the stack, in a backward manner, for future processing.

According to an embodiment herein, each actor is identified by a unique identifier, and wherein the unique identifier is composed based on the actor type and a primary key. Any two actors are recognized by each other using the said unique identifier.

According to an embodiment herein, the unique identifier of the particular actor is divided into at least four parts. The four parts comprises: a machine number configured to identify a particular machine which receives the input data stream, a cylinder number configured to identify a particular stack in the said machine, a circle number configured to identify a particular node to which the stack is present, and a cluster number configured to indicate a circular cluster-wise configuration or an inter-cluster-wise configuration of the plurality of actors.

According to an embodiment herein, the unique identifier of the particular actor is formed in a ring structure, wherein the ring structure is adopted to compute a destination actor for the input data of the actor.

According to an embodiment herein, the system combines a plurality of memories into a single combined stack node, and wherein each memory in the plurality of memories performs or functions in a similar or same manner.

According to an embodiment herein, the top element of stack provides an abstract memory interface, and wherein the abstract memory interface is implemented to perform CRUD operations with sub stack elements; and wherein the system is configured to delegate CRUD operations of top level interface to all sub parts, and wherein the system is configured to insert the stack totally as sub-element of a larger stack at low level interface.

According to an embodiment herein, a method for providing hierarchical cache for big data processing is provided. The method comprises the following steps. The actor of a particular machine receives a data from an input stream. The actor replicates the input data. The caching layer stores the replicated data. The replicated data is forwarded from the current actor to the actor of another machine, through a replication channel.

According to an embodiment herein, the method further comprises the steps for transporting the input data from the source actor to the destination actor. The method comprises the following steps. A particular actor receives the input data. A destination of the input data is computed depending on the ring structure of the actor. The unique identifier of the destination actor is determined depending on the ring structure of the said actor. The unique identifier of a previous actor family in the ring is searched for sending the input data to the previous actor family, when no direct mapping is available to find destination actor.

According to an embodiment herein, the sorting of the storage elements of the stack depends on a plurality of factors. The plurality of factors comprises a number of random switches operated in a second by a device, bandwidth of reading from the memories of the stack, and a latency of reading two consecutive storage elements of the stack.

According to an embodiment herein, the method further executes a chaining algorithm to transfer CRUD operations through the stack. The algorithm is executed to perform a plurality of operations. The plurality of operations includes a read and update operation configured to seeks top level element to find data, a write and create operation configured to loading the input data onto top level memory and further pushing from top element to the lower level stack elements, a delete operation configured to delete the read data from top element of the stack. The chaining algorithm is executed to search the stack in a chain to find a data, when there is no data available for the particular actor identifier.

According to an embodiment herein, a first in first out memory windowing mechanism is adopted or designed for a real-time processing of the input stream chunks.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for providing hierarchical cache for big data processing. The system comprises a caching layer, a plurality of actors in communication with the caching layer, a machine hosting the plurality of actors, a plurality of replication channels in communication with the said plurality of actors, and a predefined ring structure. The caching layer is a chain of memory and storage capacity elements or systems, configured to store a data from an input stream.

The plurality of actors is configured to replicate the input data stream and forward the replicated data to the caching layer. The replication channels are configured to forward the replicated data from a particular actor to another actor. The predefined ring structure maps the input data to the replica actors According to an embodiment herein, the plurality of actors comprises a source actor which is configured to receive the input data and produce a first replica of the input data, a destination actor and a plurality of replication actors.

According to an embodiment herein, the caching layer comprises a stack, a top element of the stack and an adapter operating on a top element of stack. The stack further comprises a plurality of storage elements, and wherein each storage element is configured to store an input stream chunk. The storage elements of the stack are hierarchically sorted according to an access performance of main memory operations and cost priorities. The top element of the stack is a performable memory which is available to the actor. The adapter is configured to push a received data onto the top of element.

According to an embodiment herein, the caching layer gradually pushes the received input stream chunk into a preallocated free space in each storage element of the sorted stack, According to an embodiment herein, the caching layer fetches the stored stream chunks in the stack, in a backward manner, for future processing.

According to an embodiment herein, each actor is identified by a unique identifier, and wherein the unique identifier is composed based on the actor type and a primary key. Any two actors are recognized by each other using the said unique identifier.

According to an embodiment herein, the unique identifier of the particular actor is divided into at least four parts. The four parts comprises: a machine number configured to identify a particular machine which receives the input data stream, a cylinder number configured to identify a particular stack in the said machine, a circle number configured to identify a particular node to which the stack is present, and a cluster number configured to indicate a circular cluster-wise configuration or an inter-cluster-wise configuration of the plurality of actors.

According to an embodiment herein, the unique identifier of the particular actor is formed in a ring structure, wherein the ring structure is adopted to compute a destination actor for the input data of the actor.

According to an embodiment herein, the system combines a plurality of memories into a single combined stack node, and wherein each memory in the plurality of memories performs or functions in a similar or same manner.

According to an embodiment herein, the top element of stack provides an abstract memory interface, and wherein the abstract memory interface is implemented to perform CRUD operations with sub stack elements; and wherein the system is configured to delegate CRUD operations of top level interface to all sub parts, and wherein the system is configured to insert the stack totally as sub-element of a larger stack at low level interface.

According to an embodiment herein, a method for providing hierarchical cache for big data processing is provided. The method comprises the following steps. The actor of a particular machine receives a data from an input stream. The actor replicates the input data. The caching layer stores the replicated data. The replicated data is forwarded from the current actor to the actor of another machine, through a replication channel.

According to an embodiment herein, the method further comprises the steps for transporting the input data from the source actor to the destination actor. The method comprises the following steps. A particular actor receives the input data. A destination of the input data is computed depending on the ring structure of the actor. The unique identifier of the destination actor is determined depending on the ring structure of the said actor. The unique identifier of a previous actor family in the ring is searched for sending the input data to the previous actor family, when no direct mapping is available to find destination actor.

According to an embodiment herein, the sorting of the storage elements of the stack depends on a plurality of factors. The plurality of factors comprises a number of random switches operated in a second by a device, bandwidth of reading from the memories of the stack, and a latency of reading two consecutive storage elements of the stack.

According to an embodiment herein, the method further executes a chaining algorithm to transfer CRUD operations through the stack. The algorithm is executed to perform a plurality of operations. The plurality of operations includes a read and update operation configured to seeks top level element to find data, a write and create operation configured to loading the input data onto top level memory and further pushing from top element to the lower level stack elements, a delete operation configured to delete the read data from top element of the stack. The chaining algorithm is executed to search the stack in a chain to find a data, when there is no data available for the particular actor identifier.

According to an embodiment herein, a first in first out memory windowing mechanism is adopted or designed for a real-time processing of the input stream chunks.

The embodiments herein provide a system for providing hierarchical cache for big data processing. The system is configured to create loosely available memory in a distributed memory system, by duplicating the received stream chunks using asynchronous actor messaging.

Figure 1:
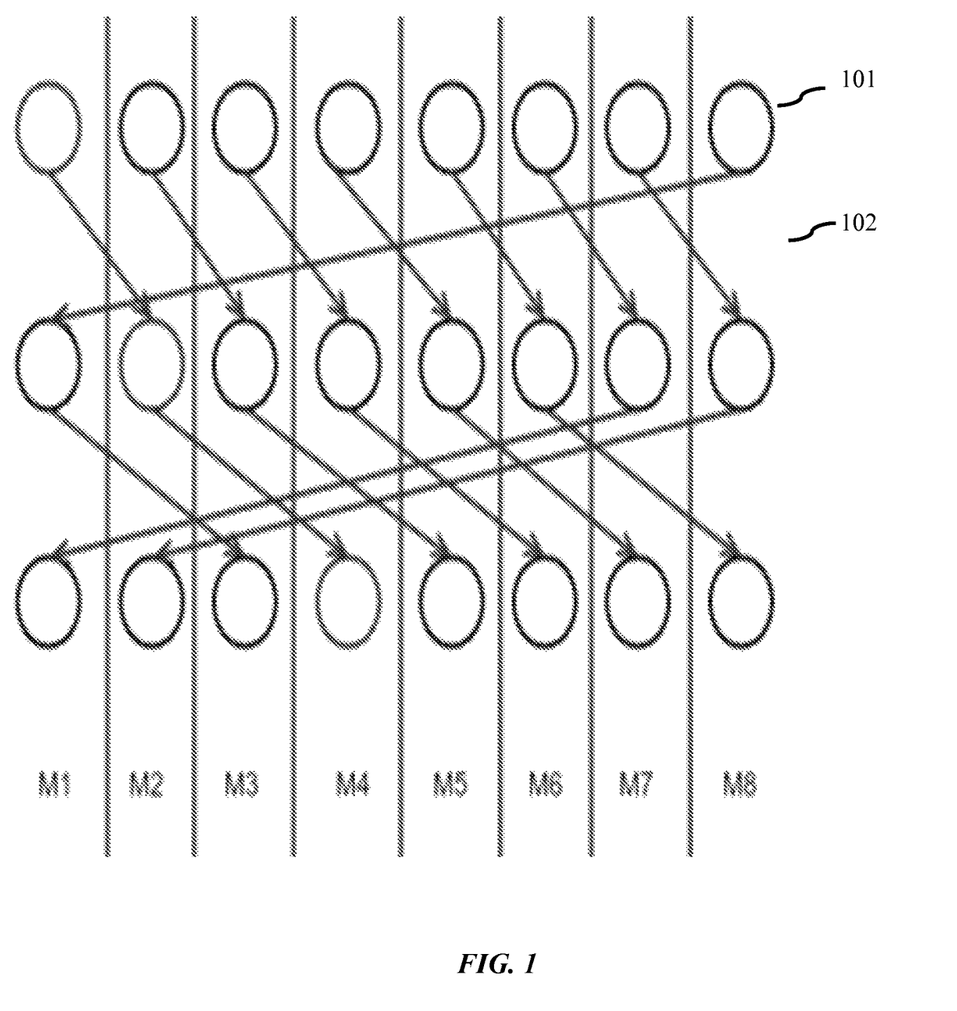
FIG. 1 illustrates a schematic diagram of a distributed system for providing hierarchical cache for big data processing, according to an embodiment herein.

FIG. 1 illustrates a schematic diagram of a distributed system for providing hierarchical cache for big data processing, according to an embodiment herein. With respect to FIG. 1, the system comprises a caching layer, a plurality of actors 101 in communication with the caching layer, a machine hosting the plurality of actors, a plurality of replication channels 102 in communication with the said plurality of actors, a predefined ring structure. The caching layer is a chain of memory and storage capacity elements, configured to store data from input stream. The plurality of actors 101 is configured to replicate the input data stream and forward the replicated data to the caching layer. The replication channels 102 are configured to forward the replicated data from a particular actor to another actor. The predefined ring structure maps an input data to the replica actors.

According to an embodiment herein, an actor is capable to performing primitive operations. The actor is configured to read from and write the data, send messages, selectively receive messages (occasionally waiting until the messages are received), and spawn new actors. The actor accesses runtime libraries, which provide essential information needed by an actor. The actor encapsulates the received data and the behavior. The access to an actor's data set is only done by the actor itself The communication between actors is done exclusively through message exchanges. The delivery of messages is asynchronous. There is no delivery receipt and there is no guarantee as to the order in which the messages are delivered. The receiving actor is able to pick or selectively receives any messages from the actor's mailbox for processing. Each actor has a unique and private execution flow associated with a message exchange scheme to keep the message exchange scheme working.

According to an embodiment herein, the plurality of actors comprises a source actor, a destination actor and a plurality of replication actors. The source actor is configured to receive input data and produce a first replica of the input data. The input data is randomly gathered by the source actor and is given to the caching layer. The caching layer replicates the input data using stream mapping and forwards the input data of stream channels to a specific destination actor. Each actor in the system has a link to another actor and wherein the link is a one way relation known by the source actor. The actor is hosted in the machine and the machine is able to host more than one actor. Several actors contain the same data as these actors are configured to replicate the data together.

According to an embodiment herein, each actor stores the data messages based on a unique identifier in a memory associated with the actor and any two actors recognize each other using the unique identifier. The unique identifier of a particular actor is composed based on the actor type and a primary key. The unique identifier of the particular actor is divided into at least four parts. The four parts comprises a machine number, a cylinder number, a circle number and a cluster number. The machine number is configured to identify a particular machine which receives the input data stream. The cylinder number is configured to identify a particular stack in the machine. The circle number is configured to identify a particular node to which the stack is present. The cluster number configured to indicate a circular cluster-wise configuration or an inter -cluster-wise configuration of the plurality of actors. The address of next actor is identified primarily by incrementing a machine part of the unique identifier to get the address of next machine. The new machine part is added with a cylinder number to reach the next address of the stack. The resultant is added to the circle field to reach other node in the local switch. The fourth address remains for cluster level replication destination.

According to an embodiment herein, the input data received by the particular actor is forwarded to the caching layer. The caching layer starts the procedure to copy the input data based on a unique identifier of the actor and the actor forwards the data to other actors in other machines. The actor forwards the input data based on the predefined ring structure, which is used to map the incoming data to the plurality of replication actors. The destination for each incoming data at the actor is determined with a mathematical computation of current actor. Each actor selects a destination for sending the incoming data. The destination is searched from the ring structure to find the URL of the destination actor. When there is no direct mapping, the procedure starts to find the previous actor family in the ring for sending the messages. This gives a possibility for fast deterministic switching between the destinations families.

According to an embodiment herein, the caching layer of the system replicates the input data using a mapping of the input data to a specific hashed destination according to the predefined replication process. The replication process is a pipelined method which enables the receiving actor to send the received data to the next replication actor. The replication mechanism is synchronized across the data persistence and caching stack to efficiently eliminate duplications for a given stream chuck.

According to an embodiment herein, the caching layer comprises a stack, a top element of the stack and an adapter operating on a top element of stack. The stack further comprises a plurality of storage elements, where each storage element is configured to store input stream chunk. The storage elements of the stack are hierarchically sorted according to an access performance of main memory operations and cost priorities. The top element of the stack is a performable memory which is available to the actor. The adapter is configured to push the received data to the top of element. The caching layer gradually pushes the received input stream chunk into a pre-allocated free space in each storage element of the sorted stack. The caching layer further fetches the stored stream chunks in the stack, in a backward manner, for future processing.

According to an embodiment herein, the caching layer adopts a sorting algorithm for hierarchically sorting the storage elements of the stack according to an access performance of main memory operations and cost priorities. The cost priority is related to sorting algorithm in a manner that the operating on high performable memories on top of the stack is fast but a limited capacity creates relative cost more, when the memories in lower stacks is used. So the system is sorted according the cost priorities. The sorting of the storage elements of the stack depends on a plurality of factors. The plurality of factors comprises a number of random switches which the machine is capable of operating in a second, bandwidth of reading from the memories of the stack, latency of reading two consecutive storage elements of the stack. The algorithm sorts the storage elements based on the factors, where the highest priority is given to elements having more capability according to first factor, then the elements having second factor and least for the third one. The equal elements according to the aforementioned factors are sorted based on natural ordering, where the ordering is fixed during system life time.

According to an embodiment herein, the system combines similar performable memories into a single combined stack node, to meet cost priorities. The top element of stack provides an abstract memory interface implemented to perform Create Read Update Delete (CRUD) operations with sub stack elements. The system is configured to delegate CRUD operations of top level interface to all sub parts. The system is further configured to insert the stack totally as sub-element of a larger stack at low level interface. The system adopts a chaining algorithm to the main stack for transferring CRUD operations through the stack. The main stack is a combined element constituting a stack of nodes sorted according to cost priorities. The algorithm comprises the following operations: Read and Update operation configured to seeks top level element to find data. The chaining algorithm goes through the stack in a chain to find data, when there is no data available for the particular actor identifier. Write and create operations configured to loading the input data onto top level memory and further pushing from top element to the lower level stack elements. The difference of write and create operation with other operations is that the system operates on top stack element and gives high speed access to memory resources that are sorted in the stack. Delete operation configured to delete the read data from top element of the stack.

According to an embodiment herein, the memory interface and standard CRUD instructions work based on a first in first out memory windowing mechanism for real-time processing of input stream chunks. The system facilitates applications such as, caching handling, real-time processing of input stream channels, loose availability of stream chunks, persistent availability of streams through the underlying storage system and caching of input and output streams in a single fusion stack. Each application operate on the distributed cached windowed of stream chunks separately and do real-time processing asynchronously.

Figure 2:
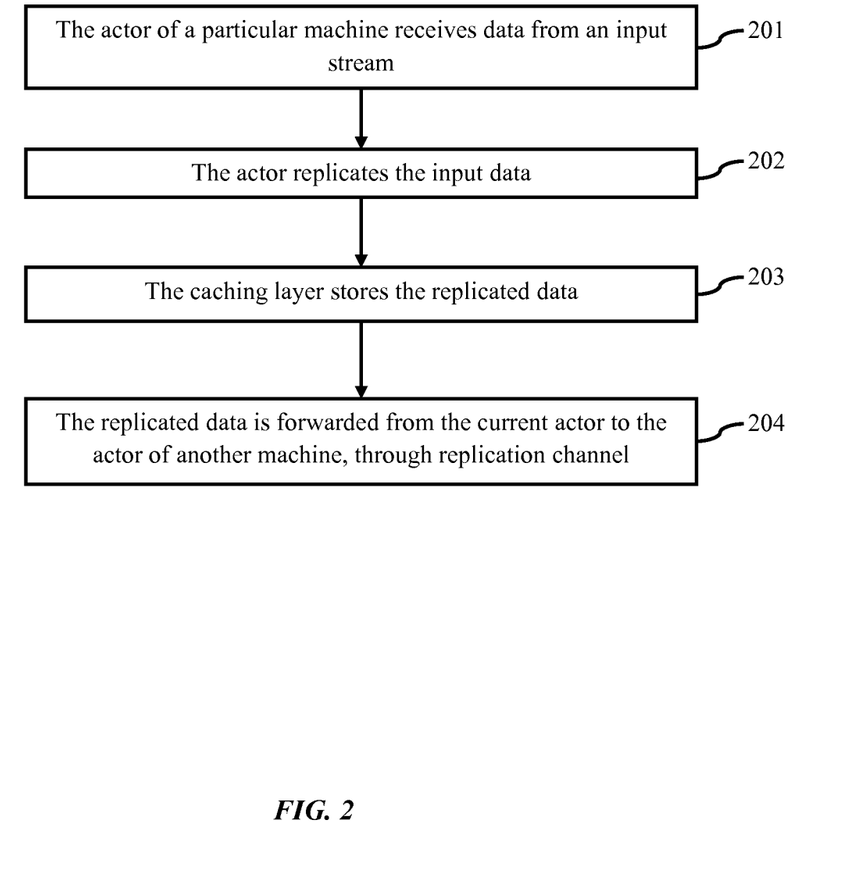
FIG. 2 illustrates a flowchart explaining the steps involved in the method for providing hierarchical cache for big data processing, according to an embodiment herein.

FIG. 2 illustrates a flowchart explaining the steps involved in the method for providing hierarchical cache for big data processing, according to an embodiment of the present disclosure. With respect to FIG. 2, a method for providing hierarchical cache for big data processing is developed. The method comprises the following steps. The actor of a particular machine receives a data from an input stream (201). The actor replicates the input data (202). The caching layer stores the replicated data (203). The replicated data is forwarded from the current actor to the actor of another machine, through replication channel (204).

According to an embodiment herein, the method further comprises steps for transporting the input data from the source actor to the destination actor. The method comprises the following steps. A particular actor receives the input data. A destination of the input data is computed depending on the ring structure of the actor. The unique identifier of the destination actor is determined depending on the ring structure of the said actor. The unique identifier of a previous actor family in the ring is found to which the input data is sent, when no direct mapping is available to find destination actor.

Figure 3:
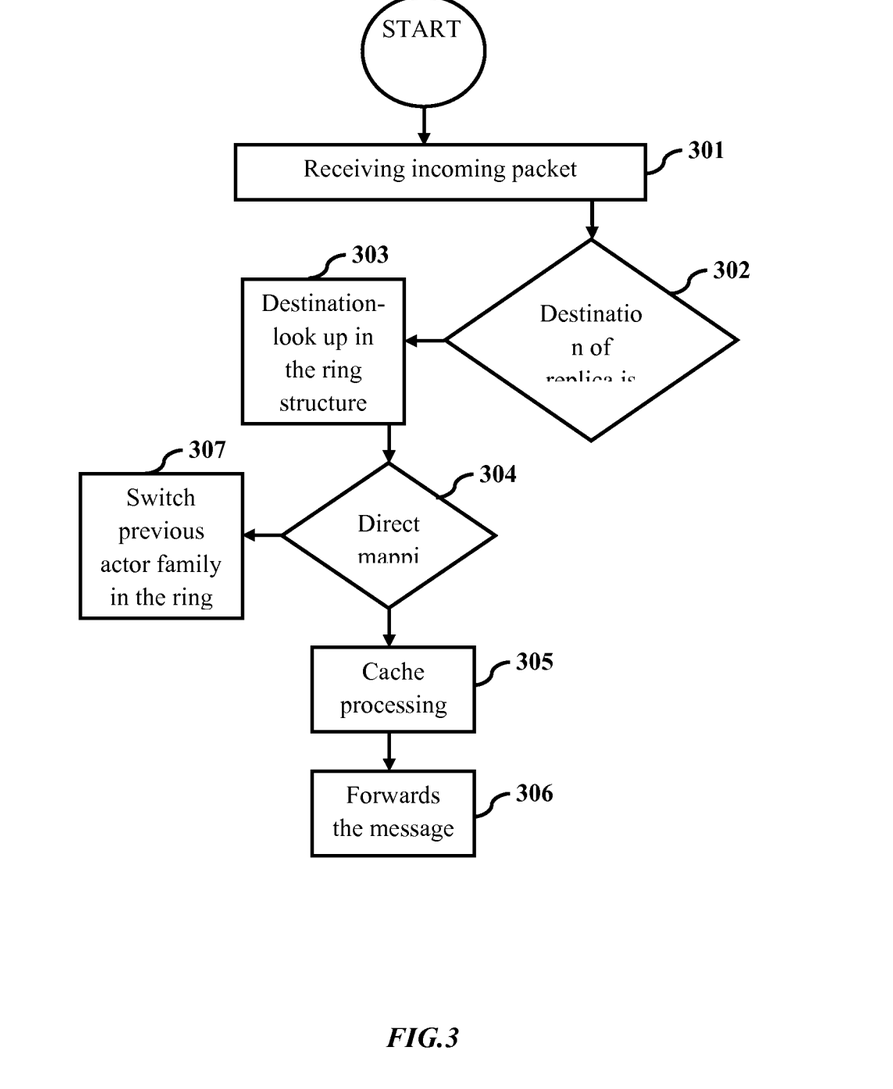
FIG. 3 illustrates a flowchart explaining the method for transporting the input data from the source actor to the destination actor, according to an embodiment herein.

FIG. 3 illustrates a flowchart explaining the method for transporting the input data from the source actor to the destination actor, according to an embodiment herein. With respect to FIG. 3, the input data received by the source actor is forwarded to the caching layer (301). The actor forwards the input data based on the predefined ring structure, which is used to map the incoming data to the plurality of replication actors. The destination for each incoming data at the actor is determined with a mathematical computation of current actor. Each actor selects a destination for sending the incoming data (302). The destination is searched from the ring structure to find the URL of the destination actor (303). The actor further checks for availability of direct mapping option for determining the unique identifier of the actor (304). When a direct mapping is available, the caching layer starts the procedure to copy the input data based on the unique identifier of the actor (305) and the actor forwards the data to other actors in other machines (306). When there is no direct mapping, the procedure starts to find the previous actor family in the ring for sending the message (307). This gives a possibility for fast deterministic switching between the destinations families.

Figure 4:
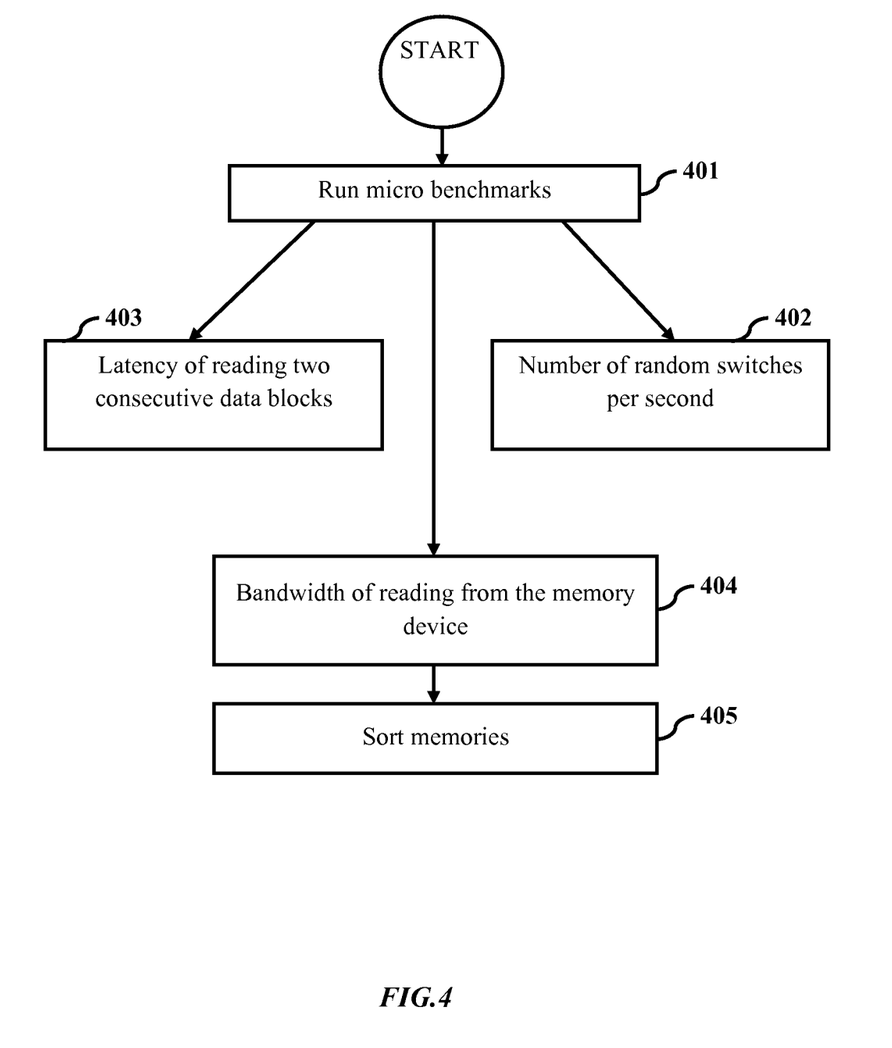
FIG. 4 illustrates a flowchart explaining the method for sorting the storage elements of the stack depending on a plurality of factors, according to an embodiment herein.

FIG. 4 illustrates a flowchart explaining the method for sorting the storage elements of the stack depending on a plurality of factors, according to an embodiment herein. With respect to FIG. 4, the method comprises the following steps. The method primarily runs micro-benchmarks to assess the relative performance parameters relating to the storage elements of the stack (401). Depending on the results obtained from the benchmarks, the method determines or estimates the number of random switches operated in a second by the machine or device (402). Accordingly the method calculates the latency of reading two consecutive storage elements of the stack (403). The method further identifies the bandwidth of reading from the memories of the stack (404). The method sorts the storage elements based on the factors, wherein the highest priority is given to elements having more capability according to first factor, then the elements having second factor and least for the third one (405).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system for providing a hierarchical cache for big data processing, the system comprising:
   a caching layer configured to store a data from an input stream, and wherein the caching layer is a chain of memory and storage capacity elements, wherein the caching layer comprises:
      a stack comprising a plurality of storage elements, and wherein each storage element is configured to store an input stream chunk, and wherein the plurality of storage elements is hierarchically sorted based on an access performance of a main memory operations and cost;
      a top element of the stack, and wherein the top element of the stack is an active memory available to the actor; and
      an adapter operated on the top element of the stack and configured to push a received data to the top element of the stack;
   a plurality of actors, in communication with the caching layer, configured to replicate the input data stream and forward the replicated data to the caching layer;
   a machine configured to host the plurality of actors;
   a plurality of replication channels, in communication with the plurality of actors, configured to forward the replicated data from a selected actor to another actor; and
   a predefined ring structure to map an input data to replicate the plurality of actors.

2. The system according to claim 1, wherein the plurality of actors comprises:
   a source actor configured to receive the input data and produce a first replica of the input data;
   a destination actor; and
   a plurality of replication actors.

3. The system according to claim 1, wherein the received input stream chunk is gradually pushed into an allocated free space in each storage element of the sorted stack.

4. The system according to claim 1, wherein the caching layer fetches the stored stream chunks in the stack in a backward manner for future processing.

5. The system according to claim 1, wherein each actor in the plurality of actors is identified with a unique identifier, and wherein the unique identifier is generated based on a type of actor and a primary key, wherein any two actors are recognized by each other using the unique identifier.

6. The system according to claim 5, wherein the unique identifier of a particular actor comprises four numbers, and wherein the four numbers include a machine number configured to identify a particular machine which receives the input data stream, a cylinder number configured to identify a particular stack in the machine, a circle number configured to identify a particular node in which the stack is present, and a cluster number configured to indicate a circular cluster-wise configuration or an inter-cluster-wise configuration of the plurality of actors.

7. The system according to claim 1, wherein the unique identifier of the particular actor is formed in a ring structure, and wherein the ring structure is configured to compute a destination actor for the input data of the actor.

8. The system according to claim 1, wherein the system combines a plurality of memories into a single combined stack node and wherein the plurality of memories acts in a similar manner.

9. The system according to claim 1, wherein the top element of the stack provides an abstract memory interface and wherein the abstract memory interface is implemented to perform CRUD operations with sub stack elements, and wherein the system is configured to delegate CRUD operations of top level interface to all sub parts, and wherein the system is configured to insert the stack totally as a sub-element of a larger stack at a low level interface.

* * * * *